United States Patent
Yang et al.

(10) Patent No.: US 11,218,876 B2
(45) Date of Patent: Jan. 4, 2022

(54) SECURE CHANNEL ESTIMATION ARCHITECTURE

(71) Applicant: Apple Inc., Cupertino, CA (US)

(72) Inventors: Shang-Te Yang, San Jose, CA (US);
Xu Chen, San Jose, CA (US);
Alejandro J. Marquez, Sunnyvale, CA (US); Mohit Narang, Cupertino, CA (US); Indranil S. Sen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 715 days.

(21) Appl. No.: 15/883,785

(22) Filed: Jan. 30, 2018

(65) Prior Publication Data
US 2019/0098507 A1   Mar. 28, 2019

Related U.S. Application Data

(60) Provisional application No. 62/564,901, filed on Sep. 28, 2017.

(51) Int. Cl.
| | |
|---|---|
| *G01S 5/02* | (2010.01) |
| *H04W 12/08* | (2021.01) |
| *H04W 76/14* | (2018.01) |
| *H04L 29/06* | (2006.01) |
| *H04W 12/12* | (2021.01) |

(52) U.S. Cl.
CPC .......... *H04W 12/08* (2013.01); *G01S 5/0215* (2013.01); *G01S 5/0273* (2013.01); *G01S 5/0278* (2013.01); *H04L 63/1483* (2013.01); *H04W 12/12* (2013.01); *H04W 76/14* (2018.02)

(58) Field of Classification Search
CPC .... G01S 5/0215; G01S 5/0273; G01S 5/0278; H04W 12/08; H04W 76/14; H04W 12/12
See application file for complete search history.

(56) References Cited

U.S. PATENT DOCUMENTS

| | | | | |
|---|---|---|---|---|
| 2006/0274843 A1* | 12/2006 | Koo | ........................ | H04J 13/14 375/260 |
| 2015/0141034 A1* | 5/2015 | Ekbatani | ............. | H04L 25/0204 455/456.1 |

OTHER PUBLICATIONS

Chacko et. al. (2017). Physical Gate Based Preamble Obfuscation for Securing Wireless Communication. 2017 International Conference on Computing, Networking and Communications: Wireless Communications. IEEE Xplore. (Year: 2017).*

* cited by examiner

*Primary Examiner* — Brian F Shaw
(74) *Attorney, Agent, or Firm* — Fletcher Yoder PC

(57) ABSTRACT

Wireless communication between two electronic devices may be used to determine a distance between the two devices, even in the presence of an otherwise-disruptive attacker. A wireless receiver system of one device may receive a true wireless ranging signal from a first transmitting device and a false wireless ranging signal from an attacker. The wireless receiver system may correlate the wireless signals with a known preamble sequence and perform channel estimation using the result, obtaining a channel impulse response for the wireless signals. The wireless receiver system may filter the channel impulse response for the plurality of wireless signals by removing at least part of the channel impulse response due to the false wireless ranging signal while not removing at least part of the channel impulse response due to the true wireless ranging signal. The receiver system may perform a wireless ranging operation using the filtered channel impulse response.

20 Claims, 12 Drawing Sheets

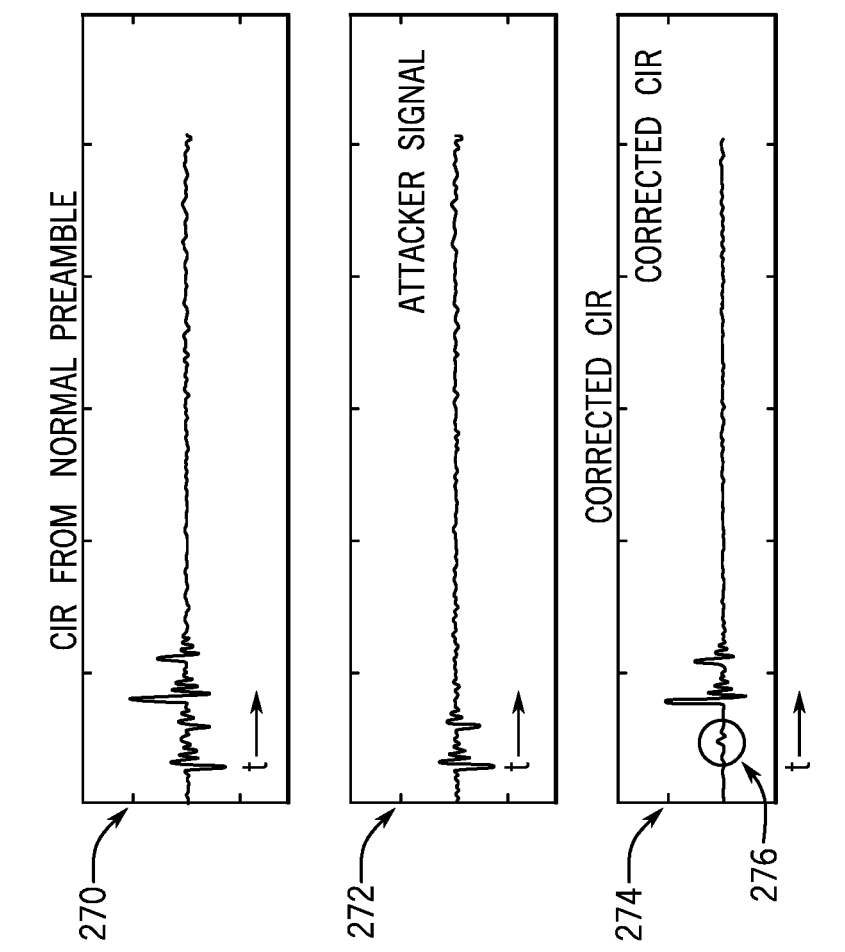

SECURE CHANNEL ESTIMATION ARCHITECTURE

This application claims priority to and benefit from U.S. Provisional Application No. 62/564,901, entitled "Secure Channel Estimation Architecture," filed Sep. 28, 2017, the contents of which is incorporated by reference in its entirety.

BACKGROUND

This disclosure relates to systems and methods for securely identifying a wireless channel in a shortest free-space path between a transmitting device and a receiving device.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Many electronic devices, such as smartphones and computers, include antennas that are used for various forms of wireless communication. Some electronic devices may benefit from determining an accurate estimate of proximity to another electronic device using wireless signals. This may be accomplished by calculating a time-of-flight estimation for a wireless signal sent over a wireless channel of the shortest free-space path between a transmitting device and a receiving device. A simple way to determine the wireless channel of the shortest free-space path involves identifying the wireless channel between the receiving device and the transmitting device that provides the strongest signal. However, the strongest signal may not always represent the shortest free-space path between the receiving device and the transmitting device. In some cases, an obstruction—such as a person—may be positioned in the shortest free-space path between the receiving device and the transmitting device. This may lower the signal strength of the wireless channel of the shortest free-space path. Meanwhile, a wireless channel in a non-direct path, such as a reflection off a wall that goes around the obstruction, could provide a stronger signal. In cases like these, then, signal strength alone may not accurately identify the shortest free-space path between the receiving device and the transmitting device.

Since the signal strength does not always indicate the wireless channel of the shortest free-space path between the receiving device and the transmitting device, identifying the shortest free-space path may involve identifying the wireless channel with the signal having the earliest arrival time. For example, the signal from the transmitting device may include a defined preamble that can be used to determine which of the possible channels provides the earliest signal, even if the earliest signal is not the strongest signal. While this may allow the receiving device to accurately identify the proximity to the transmitting device in many cases, an attacker could provide a spoofed signal using the defined preamble. The spoofed signal could appear, from the perspective of the receiving device, to be earlier than the signal from the actual shortest free-space path. In this way, an attacker could cause the receiving device to misidentify the shortest free-space path between the receiving device and the transmitting device, which could thereby cause the receiving device to calculate a false proximity.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

To protect against attacks that spoof a signal in a shortest free-space wireless channel, this disclosure provides several architectures that use both a preamble and a shared secret. Indeed, since a universally defined, plaintext preamble could be spoofed by an attacker, the systems and methods of this disclosure do not rely exclusively on a universally defined preamble to determine a shortest free-space path between a transmitting device and a receiving device. Instead, the transmitting device may send a signal that includes both a defined preamble and a cryptographically secure shared secret. Even if the attacker spoofs the preamble, the attacker may not be able to spoof the shared secret. As such, while the preamble may assist the receiving device in determining the earliest signal, and therefore the signal received over the wireless channel in the shortest free-space path, the receiving device may also rely on the shared secret.

The receiving device may use the shared secret differently according to different architectures. In one example, the preamble and the shared secret may be used together to perform channel estimation for identifying the wireless channel in the shortest free-space path to the transmitting device. However, while the preamble may be defined specifically to enable identifying the earliest signal, the shared secret may not be as effective as the preamble for this purpose. As such, in another architecture, the receiving device may use the preamble to identify the earliest signal, while using the shared secret to identify the attacker signal that lacks the correct shared secret present in the signals from the transmitting device. Having identified the attacker signal, the receiving device may filter away the attacker signal. Thus, the receiving device may estimate the wireless channel of the shortest free-space path using the preambles of the remaining non-attacker signals. In this way, a true wireless channel of the shortest free-space path between the transmitting device and the receiving device may be identified, even in the presence of an attacker.

Various refinements of the features noted above may be made in relation to various aspects of the present disclosure. Further features may also be incorporated in these various aspects as well. These refinements and additional features may be made individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 17 is a set of signal diagrams representing the operation of the system of FIG. 16 to securely identify the wireless channel in the shortest free-space by filtering away a signal from the attacker, in accordance with an embodiment.

DETAILED DESCRIPTION

Figure 1:
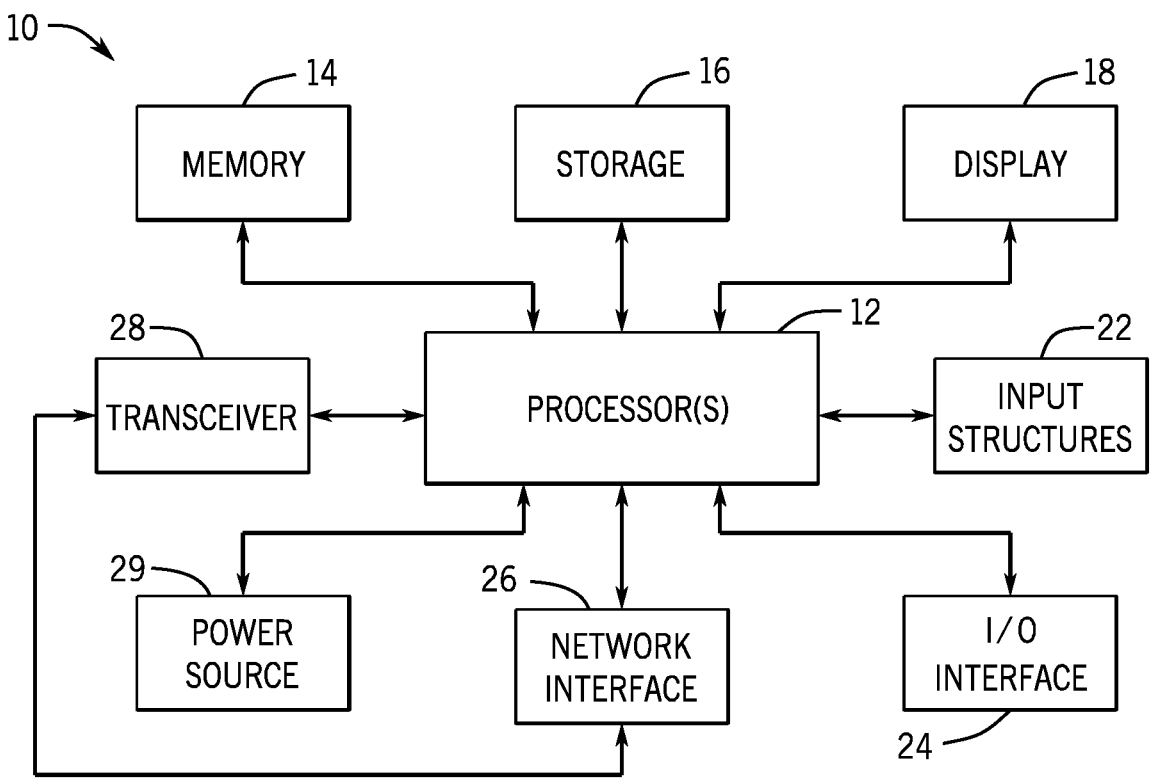
FIG. 1 is a schematic block diagram of an electronic device, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

Many electronic devices, such as smartphones and computers, include antennas that are used for various forms of wireless communication. Wireless communication between two electronic devices may be used to determine a distance between the two devices. For example, a time-of-flight estimate for a signal may indicate the distance between two devices when the signal is received over a wireless channel of the shortest free-space path between the two devices. As noted above, a simple way to determine the wireless channel of the shortest free-space path involves identifying the wireless channel between a receiving device and a transmitting device that provides the strongest signal. However, the strongest signal may not always represent the shortest free-space path between the receiving device and the transmitting device. In some cases, an obstruction—such as a person—may be positioned in the shortest free-space path between the receiving device and the transmitting device. This may lower the signal strength of the wireless channel of the shortest free-space path. Meanwhile, a wireless channel in a non-direct path, such as a reflection off a wall that goes around the obstruction, could provide a stronger signal. In cases like these, then, signal strength alone may not accurately identify the shortest free-space path between the receiving device and the transmitting device.

Since the signal strength does not always indicate the wireless channel of the shortest free-space path between the receiving device and the transmitting device, identifying the shortest free-space path may involve identifying the wireless channel with the signal having the earliest arrival time. For example, the signal from the transmitting device may include a defined preamble that can be used to determine which of the possible channels provides the earliest signal, even if the earliest signal is not the strongest signal. While this may allow the receiving device to accurately identify the proximity to the transmitting device in many cases, an attacker could provide a spoofed signal using the defined preamble. The spoofed signal could appear, from the perspective of the receiving device, to be earlier than the actual earliest signal from the actual shortest free-space path. In this way, an attacker could cause the receiving device to misidentify the shortest free-space path between the receiving device and the transmitting device, which could thereby cause the receiving device to calculate a false proximity.

Several systems and methods may be used to defend against such an attack. Since a known, plaintext preamble could be spoofed by an attacker, the systems and methods of this disclosure do not rely exclusively on a defined preamble to determine a shortest free-space path between the transmitting device and the receiving device. Instead, the transmitting device may send a signal that includes both a defined preamble and a cryptographically secure shared secret. Even if the attacker spoofs the preamble, the attacker may not be able to spoof the shared secret. As such, while the preamble may assist the receiving device in determining the earliest signal, and therefore the signal received over the wireless channel in the shortest free-space path, the receiving device may use the shared secret to identify the true shortest free-space path.

The receiving device may use the shared secret differently according to different architectures. In one example, the preamble and the shared secret may be used together to perform channel estimation for identifying the wireless channel in the shortest free-space path to the transmitting device. The preamble may be defined specifically to enable identifying the earliest signal, whereas the shared secret may not be as effective for this purpose. As such, in another architecture, the receiving device may use the preamble to identify the earliest signal, while using the shared secret to identify the attacker signal that lacks the correct shared secret present in the signals from the transmitting device. Having identified the attacker signal, the receiving device may filter away the attacker signal. The receiving device may thus estimate the wireless channel of the shortest free-space path using the preambles of the remaining non-attacker signals. Thus, a true wireless channel of the shortest free-space path may be identified to determine the proximity between the transmitting device and the receiving device, even in the presence of an attacker.

With the foregoing in mind, a general description of suitable electronic devices that may use both a defined preamble and a shared secret to accurately and securely identify a shortest free-space path to another electronic device follows below. Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24, a network interface 26, a transceiver 28, and a power source 29. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
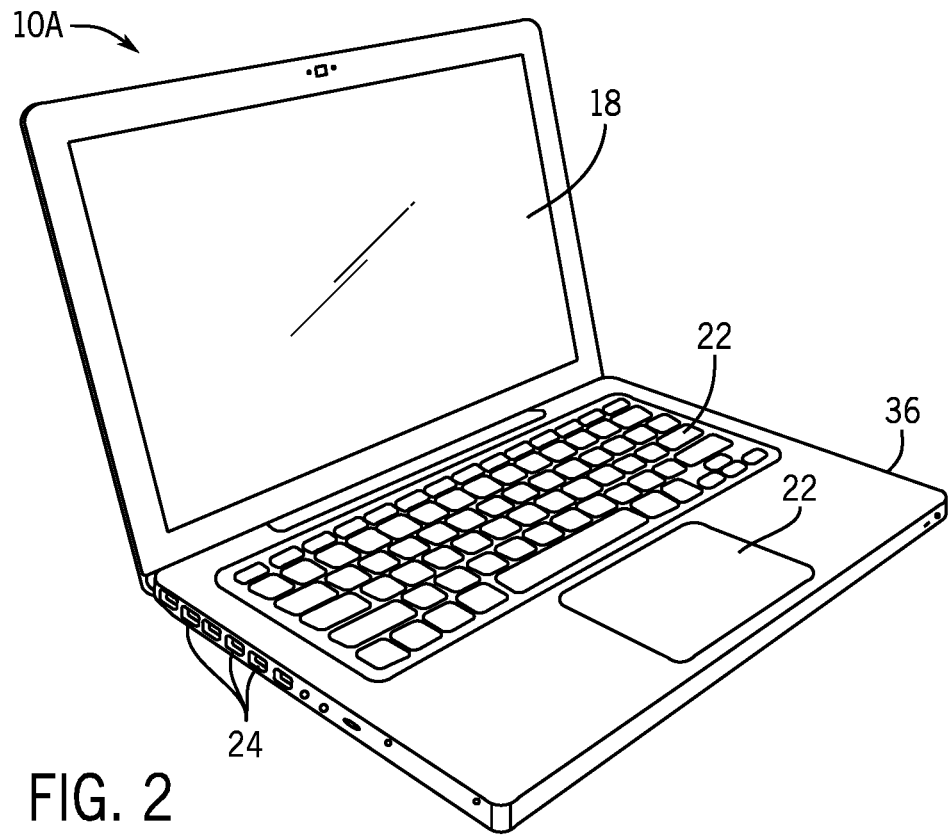
FIG. 2 is a perspective view of a notebook computer representing an embodiment of the electronic device of FIG. 1, in accordance with an embodiment.
Figure 4:
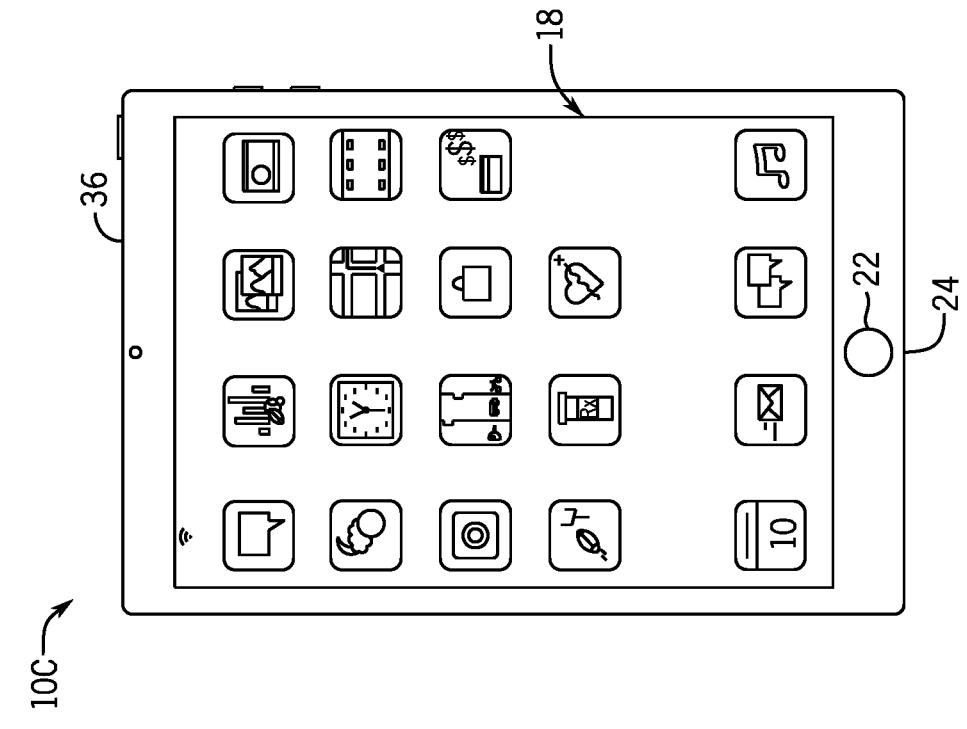
FIG. 4 is a front view of another hand-held device representing another embodiment of the electronic device of FIG. 1, in accordance with an embodiment.
Figure 3:
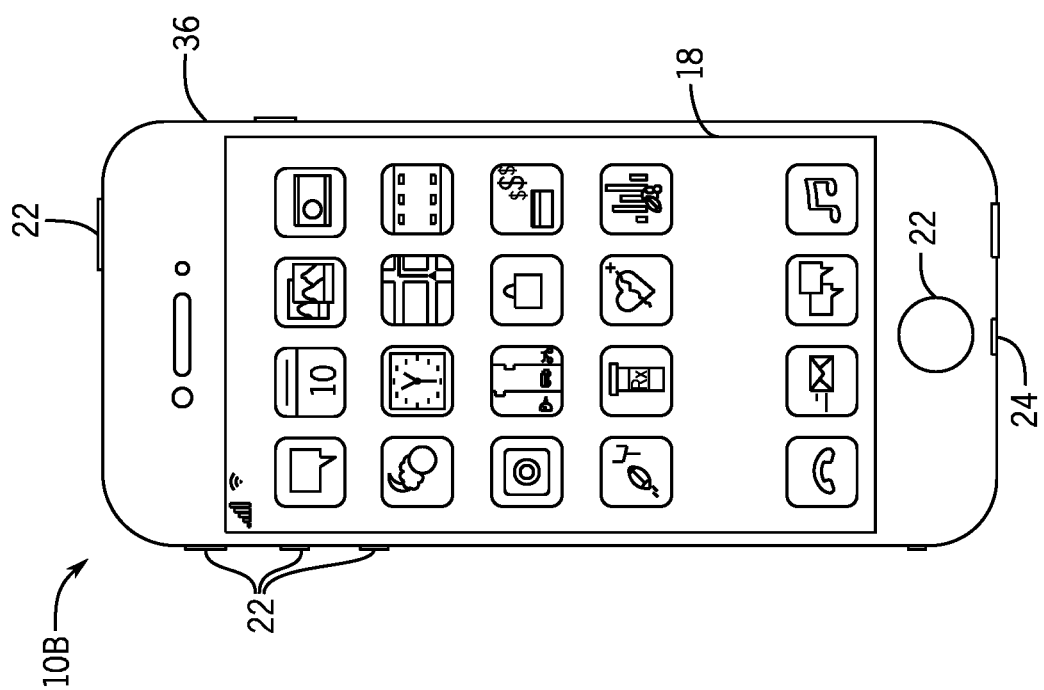
FIG. 3 is a front view of a hand-held device representing another embodiment of the electronic device of FIG. 1, in accordance with an embodiment.
Figure 5:
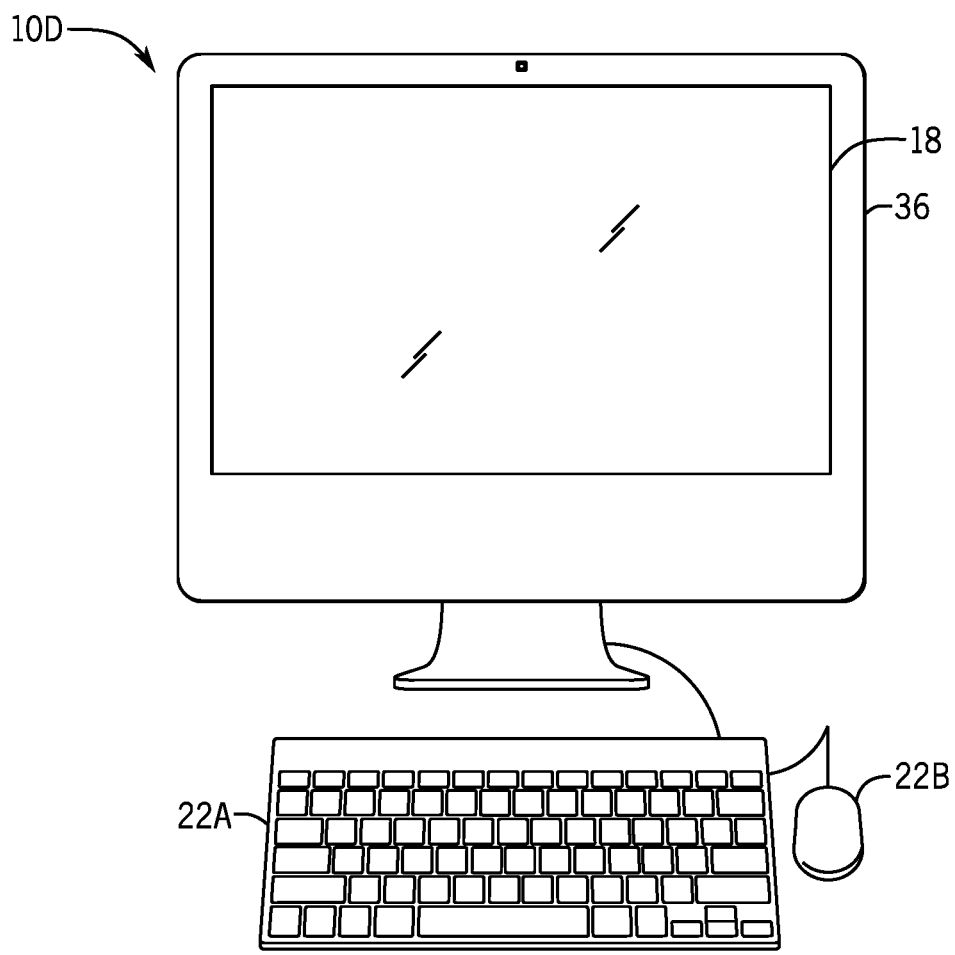
FIG. 5 is a front view of a desktop computer representing another embodiment of the electronic device of FIG. 1, in accordance with an embodiment.
Figure 6:
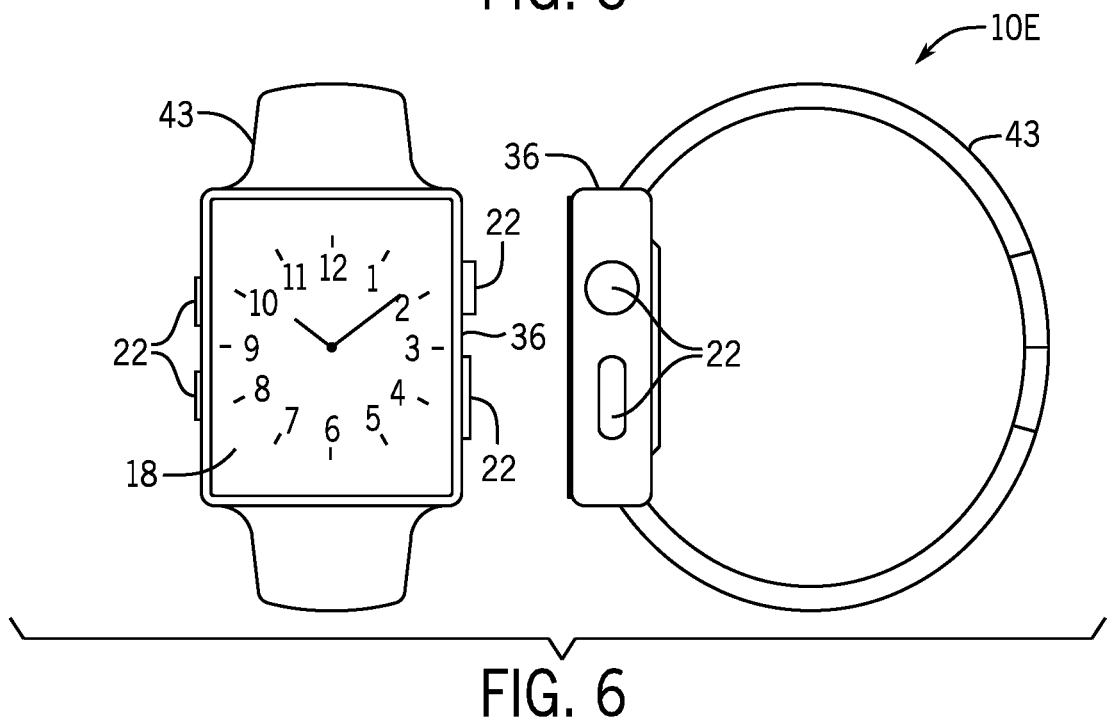
FIG. 6 is a front view and side view of a wearable electronic device representing another embodiment of the electronic device of FIG. 1, in accordance with an embodiment.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and other related items in FIG. 1 may be generally referred to herein as "data processing circuitry". Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 may be operably coupled with the memory 14 and the nonvolatile storage 16 to perform various algorithms. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor(s) 12 to enable the electronic device 10 to provide various functionalities.

In certain embodiments, the display 18 may be a liquid crystal display (LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more organic light emitting diode (OLED) displays, or some combination of liquid crystal display (LCD) panels and OLED panels. The display 18 may receive images, data, or instructions from processor 12 or memory 14, and provide an image in display 18 for interaction. More specifically, the display 18 includes pixels, and each of the pixels may be set to display a color at a brightness based on the images, data, or instructions from processor 12 or memory 14.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. The network interface 26 may include, for example, one or more interfaces for a personal area network (PAN), such as a Bluetooth network, for a local area network (LAN) or wireless local area network (WLAN), such as an 802.11x Wi-Fi network, and/or for a wide area network (WAN), such as a 3rd generation (3G) cellular network, 4th generation (4G) cellular network, long term evolution (LTE) cellular network, or long term evolution license assisted access (LTE-LAA) cellular network. The network interface 26 may also include one or more interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra-Wideband (UWB), alternating current (AC) power lines, and so forth.

In certain embodiments, to allow the electronic device 10 to communicate over the aforementioned wireless networks (e.g., Wi-Fi, WiMAX, mobile WiMAX, 4G, LTE, and so forth), the electronic device 10 may include a transceiver 28. The transceiver 28 may include any circuitry that may be useful in both wirelessly receiving and wirelessly transmitting signals (e.g., data signals). Indeed, in some embodiments, as will be further appreciated, the transceiver 28 may include a transmitter and a receiver combined into a single unit, or, in other embodiments, the transceiver 28 may include a transmitter separate from the receiver. Indeed, in some embodiments, the transceiver 28 may include several transmitters and receivers, some or none of which are combined into single units. The transceiver 28 may transmit and receive OFDM signals (e.g., OFDM data symbols) to support data communication in wireless applications such as, for example, PAN networks (e.g., Bluetooth), WLAN networks (e.g., 802.11x Wi-Fi), WAN networks (e.g., 3G, 4G, and LTE cellular networks), WiMAX networks, mobile WiMAX networks, ADSL and VDSL networks, DVB-T and DVB-H networks, UWB networks, and so forth. Further, in some embodiments, the transceiver 28 may be integrated as part of the network interfaces 26. As further illustrated, the electronic device 10 may include a power source 29. The power source 29 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations, and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 10A, is illustrated in FIG. 2 in accordance with one embodiment of the present disclosure. The depicted computer 10A may include a housing or enclosure 36, a display 18, input structures 22, and ports of an I/O interface 24. In one embodiment, the input structures 22 (such as a keyboard and/or touchpad) may be used to interact with the computer 10A, such as to start, control, or operate a GUI or applications running on computer 10A. For example, a keyboard and/or touchpad may allow a user to navigate a user interface or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, Calif. The handheld device 10B may include an enclosure 36 to protect interior components from physical damage and to shield them from electromagnetic interference. The enclosure 36 may surround the display 18. Enclosure 36 may also include sensing and processing circuitry that may be used to provide correction schemes described herein to provide smooth images in display 18. The I/O interfaces 24 may open through the enclosure 36 and may include, for example, an I/O port for a hardwired connection for charging and/or content manipulation using a standard connector and protocol, such as the Lightning connector provided by Apple Inc., a universal service bus (USB), or other similar connector and protocol.

User input structures 22, in combination with the display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone may obtain a user's voice for various voice-related features, and a speaker may enable audio playback and/or certain phone capabilities. The input structures 22 may also include a headphone input to provide a connection to external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. It should be noted that the computer 10D may also represent a personal computer (PC) by another manufacturer. A similar enclosure 36 may be provided to protect and enclose internal components of the computer 10D such as the display 18. In certain embodiments, a user of the computer 10D may interact with the computer 10D using various peripheral input devices, such as the keyboard 22A or mouse 22B (e.g., input structures 22), which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple, Inc. However, in other embodiments, the wearable electronic device 10E may include any wearable electronic device such as, for example, a wearable exercise monitoring device (e.g., pedometer, accelerometer, heart rate monitor), or other device by another manufacturer. The display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E.

Wireless Ranging

Figure 7:
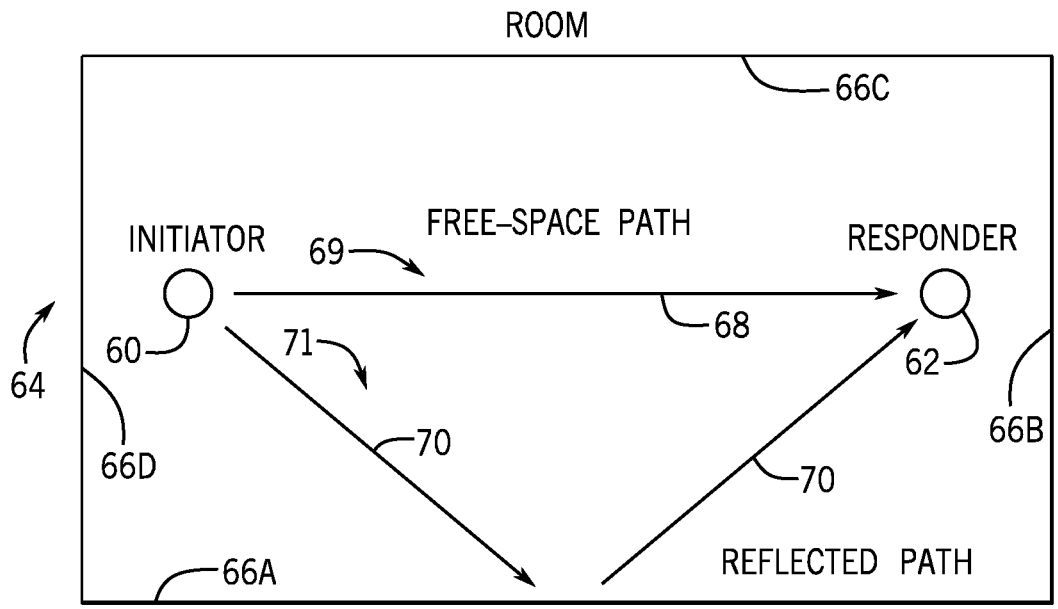
FIG. 7 is a diagram of wireless signals between a transmitting device (initiator) and a receiving device (responder) in a room that includes a wireless channel in the free-space path and a wireless channel of a reflected path, in accordance with an embodiment.
Figure 8:
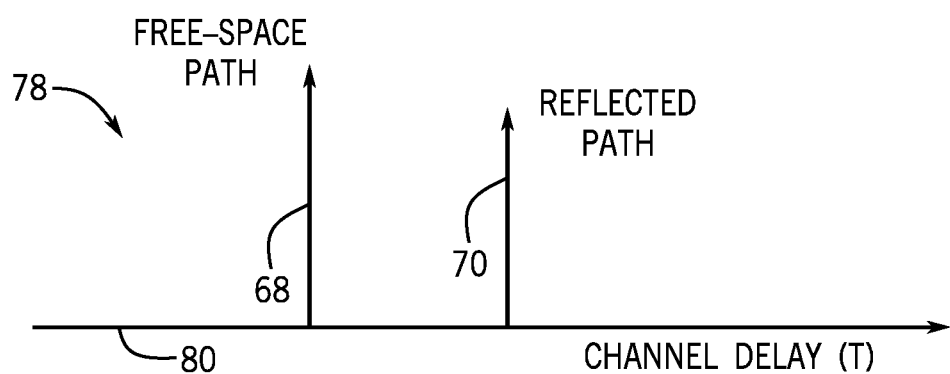
FIG. 8 is a signal diagram illustrating a signal strength and timing of signals received via the wireless channel of the shortest free-space path and the wireless channel of the reflected path of FIG. 7, in accordance with an embodiment.

Wireless communication to an electronic device 10 from a transmitting device may be used to determine a distance between the electronic device 10 and the transmitting device. This may be referred to as "wireless ranging." For example, as shown in FIG. 7, an initiator 60 (e.g., a first electronic device 10) may communicate with a responder 62 (e.g., a second electronic device 10) in a room 64. The room 64 may have walls 66A, 66B, 66C, and 66D. The initiator 60 may communicate wirelessly with the responder 62 by sending a wireless ranging signal in the form of a first wireless signal 68 that travels directly to the responder 62 via a free-space channel 69 through a shortest free-space path. Meanwhile, a second copy of the wireless ranging signal in the form of a second wireless signal 70 reaches the responder 62 via a reflected channel 71 that reflects off of the wall 66A. A signal timing diagram 78 of FIG. 8 shows that, as a consequence, the responder 62 may initially receive the free-space first wireless signal 68 in time 80 before receiving the reflected second wireless signal 70. Because the reflected second wireless signal 70 loses energy when the second wireless signal 70 reflects against the wall 66A, the free-space first wireless signal 68 has a greater signal strength than the reflected second wireless signal 70. In a situation like this, the stronger signal strength correlates with the channel in the most direct path between the initiator 60 and the responder 62.

Figure 9:
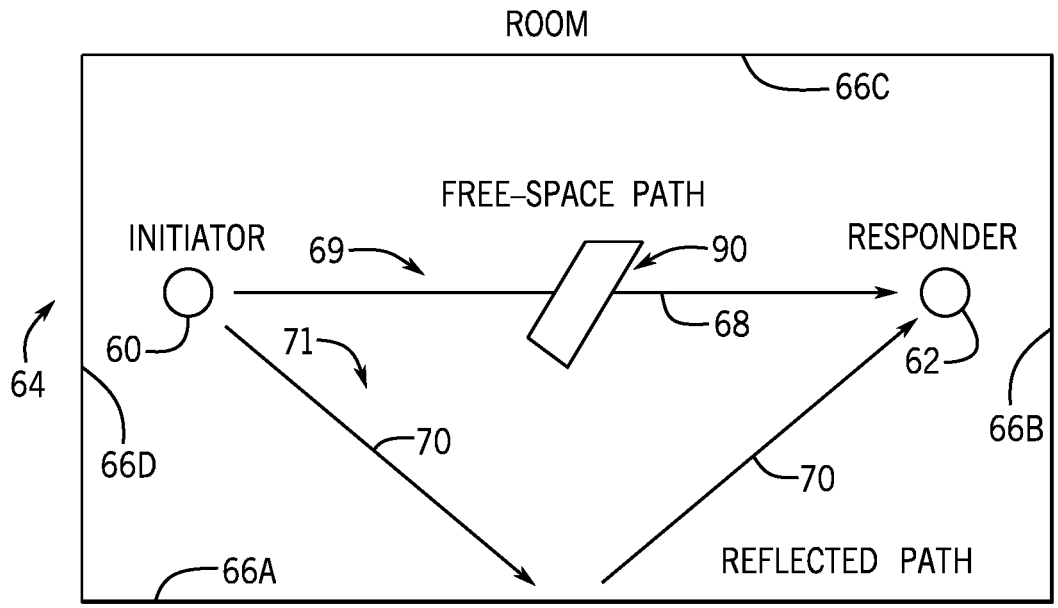
FIG. 9 is a diagram of wireless signals between the transmitting device (initiator) and the receiving device (responder) in the room of FIG. 7 in which the wireless channel in the free-space path is obstructed, in accordance with an embodiment.
Figure 10:
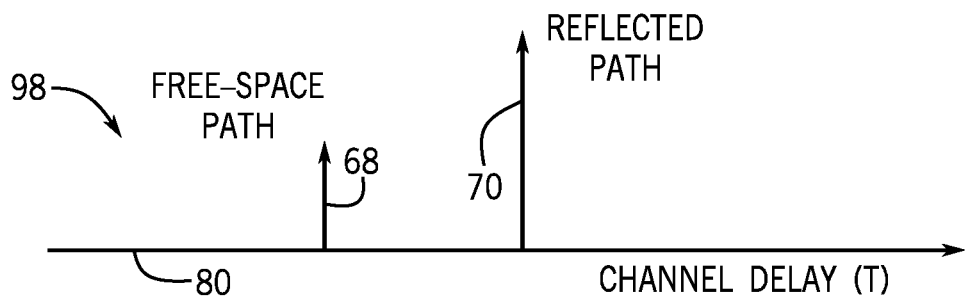
FIG. 10 is a signal diagram illustrating a signal strength and timing of signals received via the obstructed channel of the shortest free-space path and the wireless channel of the reflected path of FIG. 9, in accordance with an embodiment.
Figure 11:
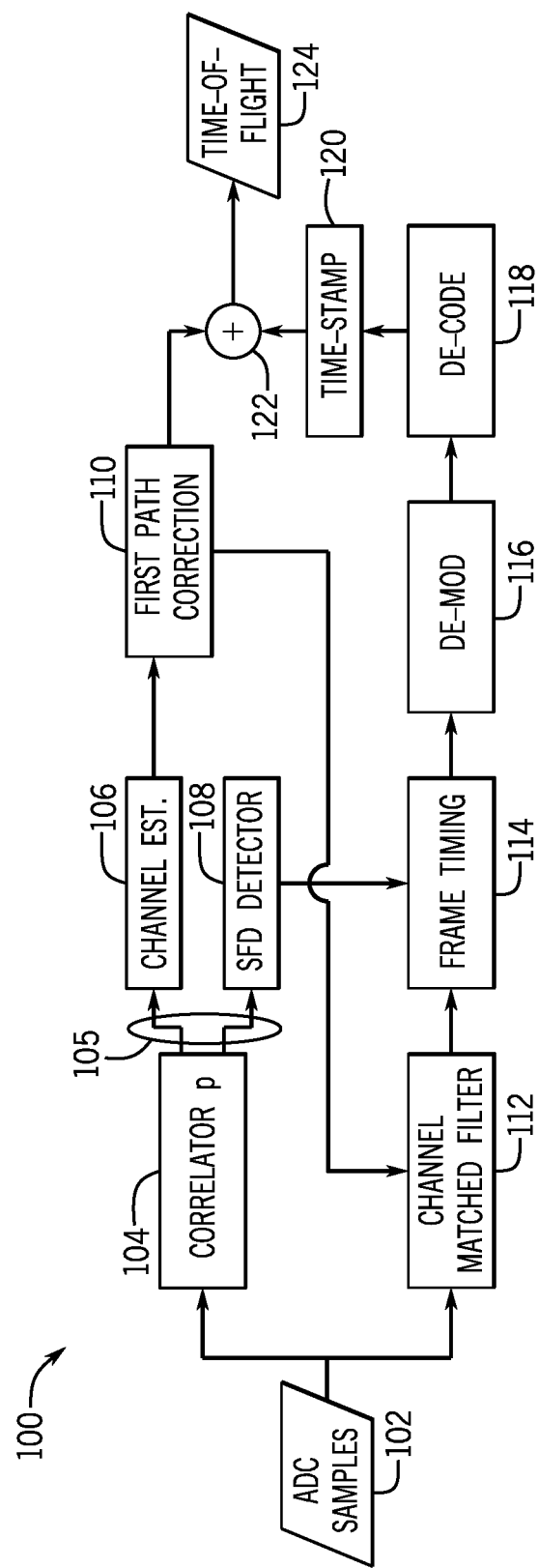
FIG. 11 is a block diagram of a system for identifying the wireless channel in the shortest free-space path to determine a time-of-flight through the shortest free-space path between the transmitting device (initiator) and the receiving device (responder), in accordance with an embodiment.

But this is not always the case. Indeed, in some cases, such as the one shown by FIG. 9, an obstruction 90 may stand in the free-space path of the first wireless signal 68. This could happen, for example, when a person or furniture is located directly between the initiator 60 and the responder 62. Here, as shown by a signal timing diagram 98 of FIG. 10, the free-space first wireless signal 68 may still arrive earlier in time 80 than the reflected second wireless signal 70. However, the free-space first wireless signal 68 is attenuated and may even have a lower signal strength than the reflected second wireless signal 70. Accordingly, in some embodiments, the responder 62 may employ a receiver system 100 as shown in FIG. 11, which may aim to identify the shortest free-space channel 69 that conveys the first wireless signal 68, even when the first wireless signal 68 has a lower signal strength than signals from other channels (such as the reflected second wireless signal 70 in the reflected channel 71). The receiver system 100 is described in block diagram form in FIG. 11. The various components of the receiver system 100 may be implemented in digital circuitry, software running on a processor (e.g., firmware), or some combination of these.

The receiver system 100 of FIG. 11 may receive digitized analog-to-digital (ADC) samples 102 received from an antenna of the transceiver 28. A correlator 104 may compare the received ADC samples 102 to a known preamble p. The preamble p may be a predefined set of values that is known at least to the initiator 60 and responder 62. In some embodiments, the preamble p may be publicly known. As such, the preamble p may be sent via plaintext in at least some embodiments. Moreover, the preamble p may take any suitable signal structure that enables the correlator 104 to accurately and/or efficiently (e.g., with reduced or minimal signal sidelobes) produce a preamble correlation signal 105. The correlator 104 may provide the preamble correlation signal 105 to a channel estimation block 106 and a start-of-frame delimiter (SFD) detector 108. The channel estimation block 106 may identify characteristics of the various channels (e.g., free-space channel 69, reflected channel 71), including which of the channels provides the earliest signal, by analyzing the preamble correlation signal 105 from the correlator 104. The channel that provides the earliest signal may be referred to in this disclosure as the "earliest channel." Having identified the earliest channel, a first path correction block 110 may identify when the signal from the earliest channel was received (e.g., when in time the first wireless signal 68 was received on the free-space channel 69) as a first path correction value. The first path correction value can be used in combination with other information to determine a proximity between the initiator 60 and the responder 62.

The ADC samples 102 may also enter a channel-matched filter 112 that analyzes the ADC samples 102 for each channel based on the channel estimation from the channel estimation block 106. The filtered results may be aligned in a frame timing block 114 according to the start-of-frame delimiter from the SFD detector 108 to extract data that can be demodulated in a demodulation block 116 and decoded in a decode block 118 to identify a timestamp 120. The timestamp 120 represents the time provided by the initiator 60 that indicates when the initiator 60 transmitted the communication to the responder 62. By comparing the result of the first path correction block 110 and the timestamp 120 in an adder 122, a time-of-flight value 124 may be computed. The time-of-flight value 124 represents the time taken for the first wireless signal 68 to travel the shortest free-space path via the free-space channel 69 between the initiator 60 and the responder 62. Using the time-of-flight value 124 and the physical parameter of the speed of electromagnetic radiation, the physical distance between the initiator 60 and the responder 62 can be estimated.

Figure 12:
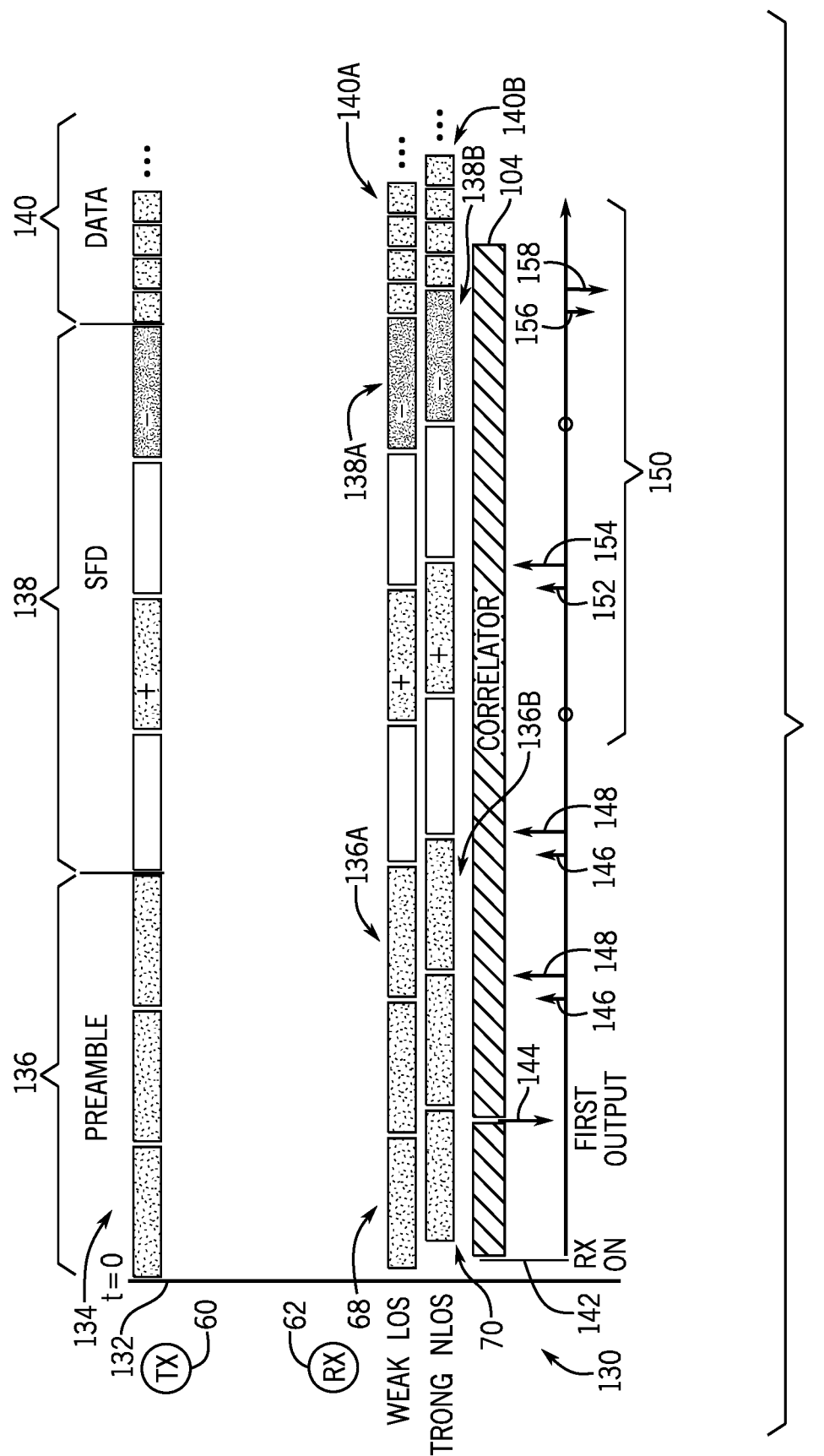
FIG. 12 is a timing diagram of signals transmitted and received between the transmitting device (initiator) and the receiving device (responder) using the system of FIG. 11, in accordance with an embodiment.

A timing diagram 130 shown in FIG. 12 provides an example of the communication that may take place between the initiator 60 and the responder 62 using the system of FIG. 11. The timing diagram 130 shows that, at a time 132, the initiator 60 begins to transmit a wireless signal 134. The wireless signal 134 may contain several components, including an initial preamble p 136 and a start-of-frame delimiter (SFD) 138, followed by data 140 (which may encode the timestamp 120). The wireless signal 134 may be received by the responder 62 as the free-space first wireless signal 68 and the reflected second wireless signal 70. At a time 142, the correlator 104 of the responder 62 may begin to analyze the received free-space first wireless signal 68 and the reflected second wireless signal 70 for a matching preamble p sequence (e.g., as the preamble correlation signal 105 shown in FIG. 11).

In FIG. 12, a first preamble match is identified as signal 144 and occurs when a first preamble p sequence of the free-space first wireless signal 68 is received. Thereafter, a preamble match signal 146 occurs every time the preamble p sequence is found in a corresponding received preamble sequence 136A of the free-space first wireless signal 68. A preamble match signal 148 occurs every time the preamble p sequence is found in a corresponding received preamble sequence 136B in the reflected second wireless signal 70. In the example of FIG. 12, the preamble match signal 146 appears earlier than the preamble match signal 148, but the preamble match signal 146 has a lower magnitude than the preamble match signal 148 because the signal strength of the free-space first wireless signal 68 is lower the reflected second wireless signal 70 (e.g., due to some obstruction along the free-space channel 69). The correlator 104 may also identify components of a received start-of-frame delimiter (SFD) 138A of the free-space first wireless signal 68 and of a received start-of-frame delimiter (SFD) 138B of the reflected second wireless signal 70 as SFD match signals 150. For example, positive SFD match signal 152 relates to the received SFD 138A, positive SFD match signal 154 relates to the received SFD 138B, negative SFD match signal 156 relates to the received SFD 138A, and negative SFD match signal 158 relates to the received SFD 138B. The SFD match signals 150 allow the responder 62 to identify the start of received data 140A or 140B received via each wireless channel. Here, the correlator 104 is used to determine which of the signals 68 or 70 are in the earliest channel.

Figure 13:
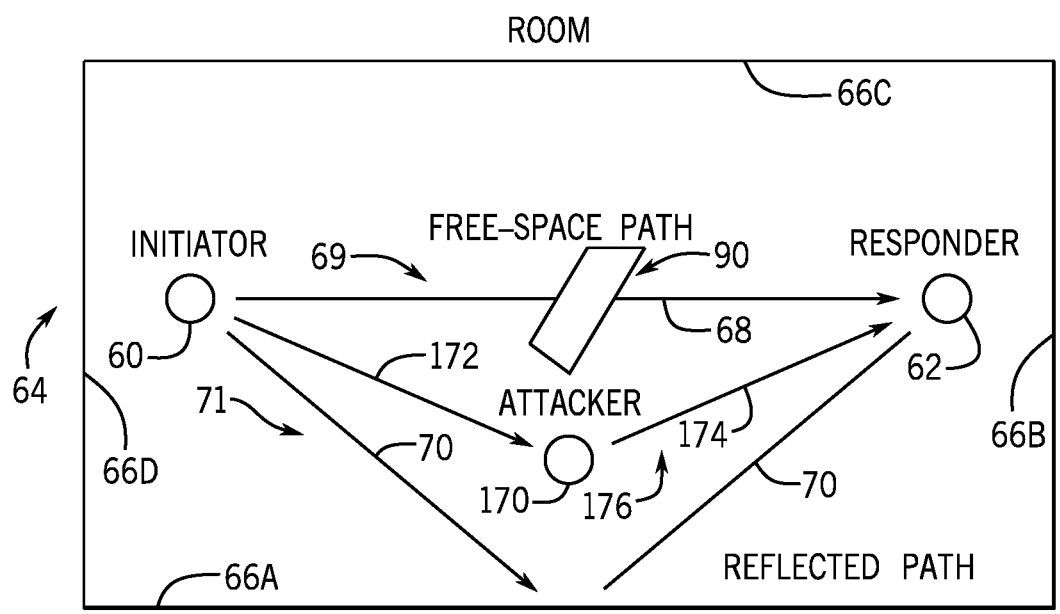
FIG. 13 is a diagram of wireless signals between the transmitting device (initiator) and the receiving device (responder) in the room of FIG. 9 in which an attacker is sending a spoofed signal, in accordance with an embodiment.

Yet the system of FIGS. 11 and 12 could be vulnerable to certain attacks. Building on the previous examples of FIGS. 7 and 9, in FIG. 13, an attacker 170 may intercept the transmission from the initiator 60 (represented as intercepted wireless signal 172) and then delay and retransmit the intercepted wireless signal 172 as a false wireless ranging signal in the form of an attack signal 174 to the responder 62. To distinguish from the true shortest free-space channel 69 and the reflected path channel 71, the channel through which the attack signal 174 reaches the responder 62 will be referred to in this disclosure as an attack channel 176. Note also that, while the attacker 170 is shown to be between the initiator 60 and the responder 62, it is possible for the attacker 170 to be remote from the initiator 60 and the responder 62 and still mount an attack. In some cases, the attacker 170 could be very far (e.g., hundreds or even thousands of meters) from the initiator 60 and the responder 62.

Figure 14:
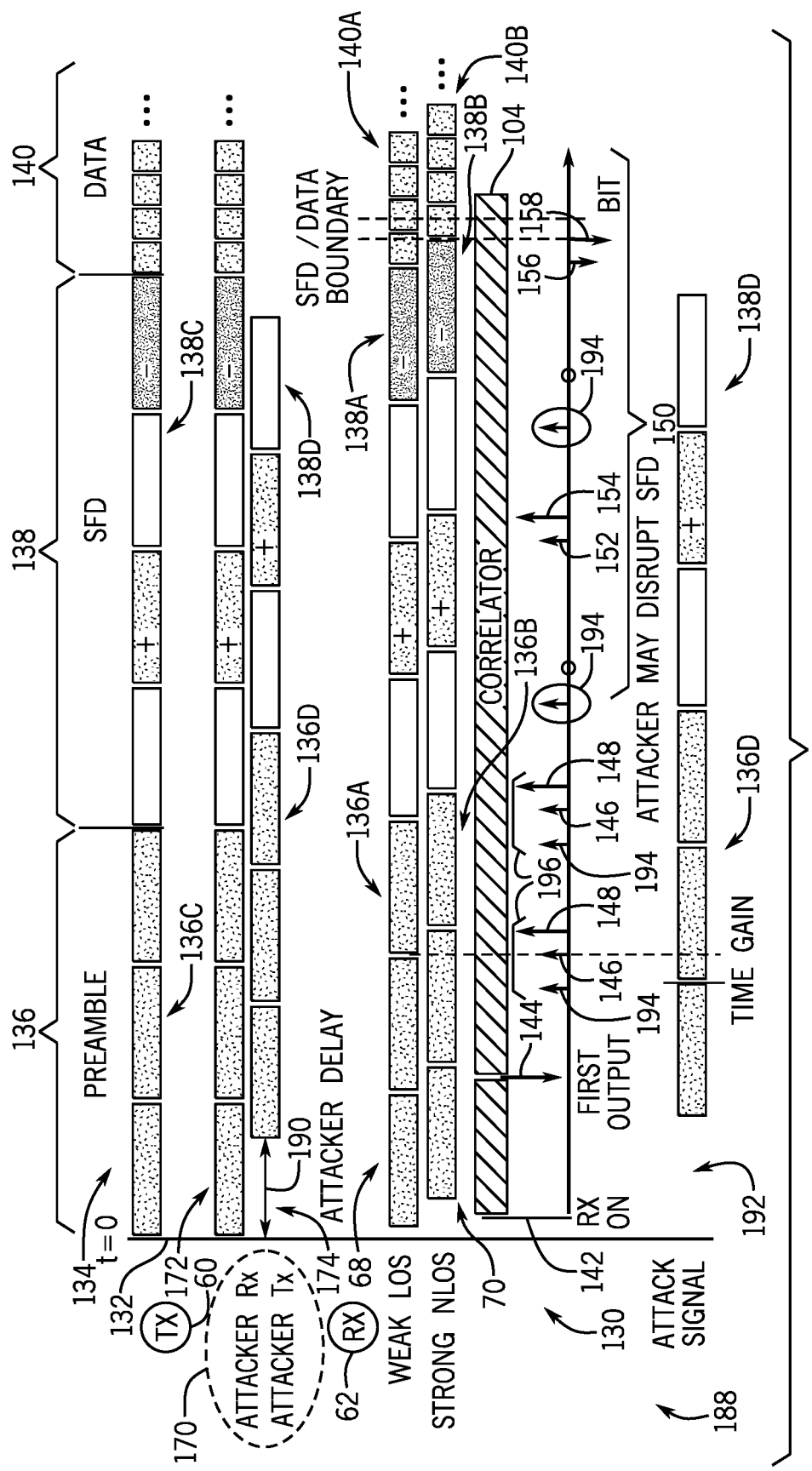
FIG. 14 is a timing diagram of signals transmitted by the transmitting device (initiator) and the attacker and received by the receiving device (responder) using the system of FIG. 11, in accordance with an embodiment.

The effect of the attack signal 174 on the receiver system 100 is shown by a signal timing diagram 188 in FIG. 14, which builds on the example signal timing diagram 130 of FIG. 12. As such, a description of elements that appear in both FIGS. 12 and 14 may be found in the previous discussion with reference to FIG. 12. In FIG. 14, the attacker 170 is shown to receive the intercepted wireless signal 172 quickly after it has been transmitted by the initiator 60. The intercepted wireless signal 172 includes a preamble 136C and a start-of-frame delimiter (SFD) 138C that corresponds to the preamble 136 and the SFD 138 from the initiator 60. The attacker 170 holds the signal for an attacker delay period 190 before transmitting the attack signal 174, which includes a preamble 136D and an SFD 138D that corresponds to the preamble 136C and the SFD 138C. The attacker delay period 190 delays the attack signal 174 just enough to cause the attack signal 174, when received by the responder 62 as a received attack signal 192, to appear to be arriving earlier than either the free-space first wireless signal 68 or the reflected second wireless signal 70 due to the periodicity of the preambles 136A, 136B, and 136D. Accordingly, when the correlator 104 generates a preamble match signal 194 corresponding to a match to the preamble 136D, it recurs before the preamble match signals 144 and 146 in a repeating pattern 196. As a consequence, the responder 62 may interpret the attack channel 176 that carries the attack signal 174 to be the earliest channel. This may prevent or complicate the efforts by the responder 62 to correctly identify the free-space channel 69.

Secure Receiver Architecture Using Shared Secret for Channel Estimation

Figure 15:
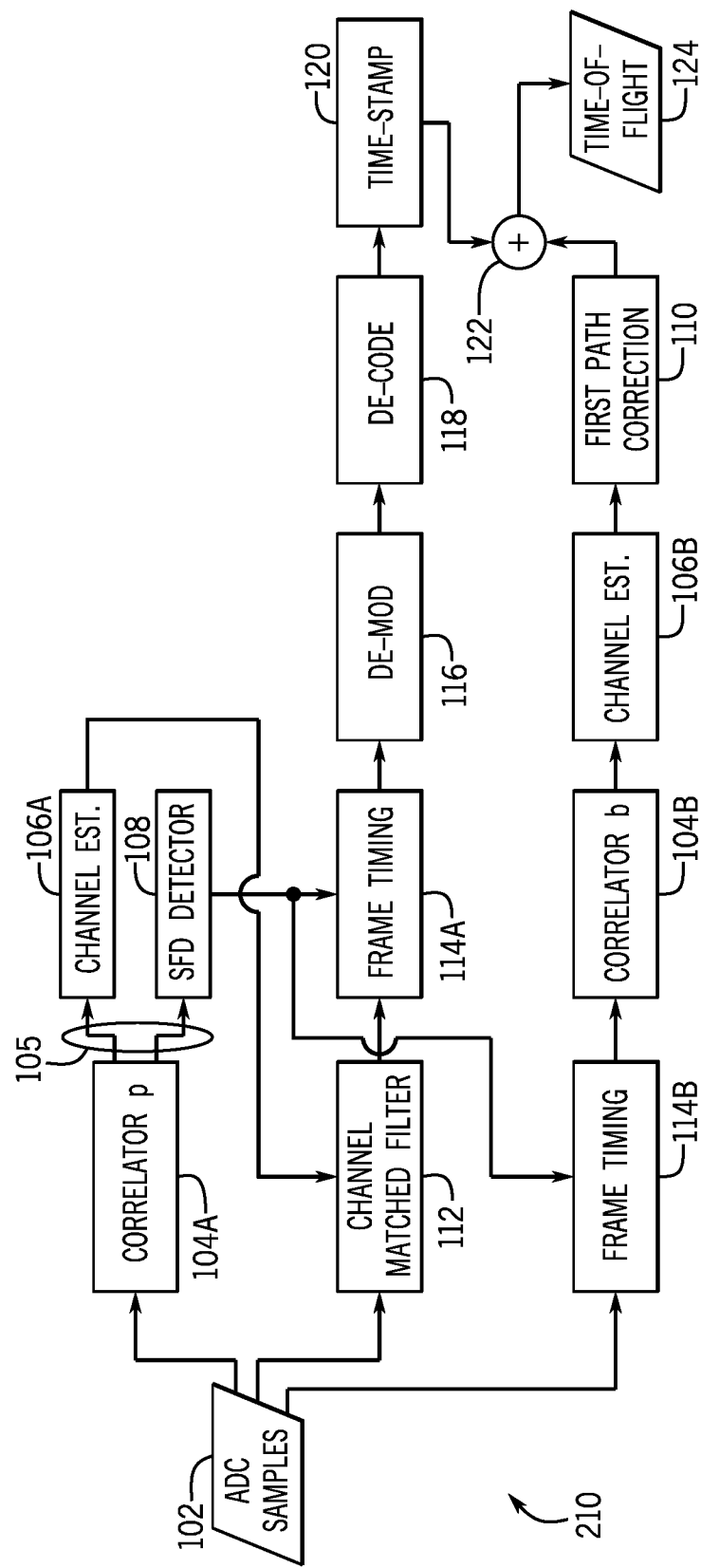
FIG. 15 is a block diagram of a system for securely identifying the wireless channel in the shortest free-space path to determine a time-of-flight through the shortest free-space path between the transmitting device (initiator) and the receiving device (responder) in the presence of an attacker, in accordance with an embodiment.

A secure receiver system 210, shown in FIG. 15, may allow the responder 62 to thwart attacks like those discussed above, while still allowing the responder 62 to identify the shortest free-space channel 69 that conveys the first wireless signal 68. The receiver system 210 is described in block diagram form in FIG. 15. The various components of the receiver system 210 may be implemented in digital circuitry, software running on a processor (e.g., firmware), or some combination of these.

The receiver system 210 of FIG. 15 may receive digitized analog-to-digital (ADC) samples 102 received from an antenna of the transceiver 28. A first correlator 104A may compare the received ADC samples 102 to a known preamble p. The preamble p may be a predefined set of values that is known at least to the initiator 60 and responder 62. In some embodiments, the preamble p may be publicly known. As such, the preamble p may be sent via plaintext in at least some embodiments. Moreover, the preamble p may take any suitable signal structure that enables the first correlator 104A to accurately and/or efficiently (e.g., with reduced or minimal signal sidelobes) produce a preamble correlation signal 105. The first correlator 104A may provide the preamble correlation signal 105 to a first channel estimation block 106A and a start-of-frame delimiter (SFD) detector 108. The first channel estimation block 106A may estimate the various channels (e.g., free-space channel 69, reflected channel 71, attack channel 176), by analyzing the preamble correlation signal 105 from the first correlator 104A. Yet the first channel estimation block 106A may not alone identify the earliest channel if the attack signal 174 is being sent through the attack channel 176 in a way that makes the attack signal 174 appear to be the earliest signal. Instead, the first channel estimation block 106A may be used identify the various channels over which the responder 62 may be receiving signals, since it is possible that an attacker signal (e.g., the attack signal 174) could spoof the preamble. Instead, as will be discussed further below, the receiver system 210 may use a shared secrete b to identify the earliest channel.

As in the receiver system 100 discussed above, in the receiver system 210, the ADC samples 102 may also enter a channel-matched filter 112 that analyzes the ADC samples 102 for each channel identified by the first channel estimation block 106A. The filtered results may be aligned in a first frame timing block 114A according to the start-of-frame delimiter from the SFD detector 108 to extract data that can be demodulated in a demodulation block 116 and decoded in a decode block 118 to identify a timestamp 120. The timestamp 120 represents the time provided by the initiator 60 that indicates when the initiator 60 transmitted the communication to the responder 62.

In addition, the receiver system 210 may identify the earliest channel using a shared secret b. Namely, the shared secret b may be any cryptographically secure value that is known by both the initiator 60 and the responder 62, but which is not known by the attacker 170. In one example, the shared secret b appears as a cryptographically secure pseudorandom number. Thus, if the attacker 170 attempts to retransmit the shared secret b, which does not have a known periodicity like the preamble p that the attacker 170 could exploit, the retransmitted shared secret b would arrive later and could be identified as late for that reason. On the other hand, if the attacker 170 attempts to use a false shared secret b', it will not match the shared secret b that is known by the responder 62.

Thus, the receiver system 210 may use a second frame timing block 114B (which may reuse the same circuitry, software, or other processing logic as the first frame timing block 114A) to align the ADC samples 102 to the start of the frame to begin receiving data that ostensibly contains the shared secret b. A second correlator 104B (which may reuse the same circuitry, software, or other processing logic as the first correlator 104A) may provide shared secret match signals 212 to a second channel estimation block 106B (which may reuse the same circuitry, software, or other processing logic as the first channel estimation block 106A).

Because the shared secret b has a sufficiently high entropy to be secure, and therefore lacks the predictable periodicity of the preamble p, the shared secret match signals 212 output by the second correlator 104B may have a higher-order behavior in comparison to the preamble match signals 105 output by the first correlator 104A. The higher-order behavior of the shared secret match signals 212 may manifest as sidelobes or other higher-order signal features. As such, when the shared secret match signals 212 enter the second channel estimation block 106B, channel estimation may be more difficult when the signal strength is relatively low, which could happen if the earliest free-space channel is obstructed in some way (e.g., if there is an obstruction 90 that lowers the signal strength of the free-space first wireless signal 68 in the free-space channel 69).

Even so, because the attacker 170 does not know the shared secret b, any data from the attack signal 174 that purports to represent a false shared secret b' will not reliably produce the shared secret match signals 212 that would be expected from the true shared secret b. As such, the second channel estimation block 106B may not estimate the attack channel 176. Consequently, when the results of the channel estimation from the second channel estimation block 106B enter a first path correction block 110, only the channels for the true signals may be estimated. Thus, provided the signal strength is sufficient to overcome the higher-order behavior of the shared secret match signals 212, the first path correction block 110 may be able to determine the arrival time of the first wireless signal 68 on the free-space channel 69. By comparing the result of the first path correction block 110 and the timestamp 120 in an adder 122, a time-of-flight value 124 may be computed. The time-of-flight value 124 represents the time taken for the first wireless signal 68 to travel the shortest free-space path via the free-space channel 69 between the initiator 60 and the responder 62. Using the time-of-flight value 124 and the physical parameter of the speed of electromagnetic radiation (e.g., the speed of light), the physical distance between the initiator 60 and the responder 62 can be estimated.

Secure Receiver Architecture to Filter Attack Signal Using Shared Secret

Figure 16:
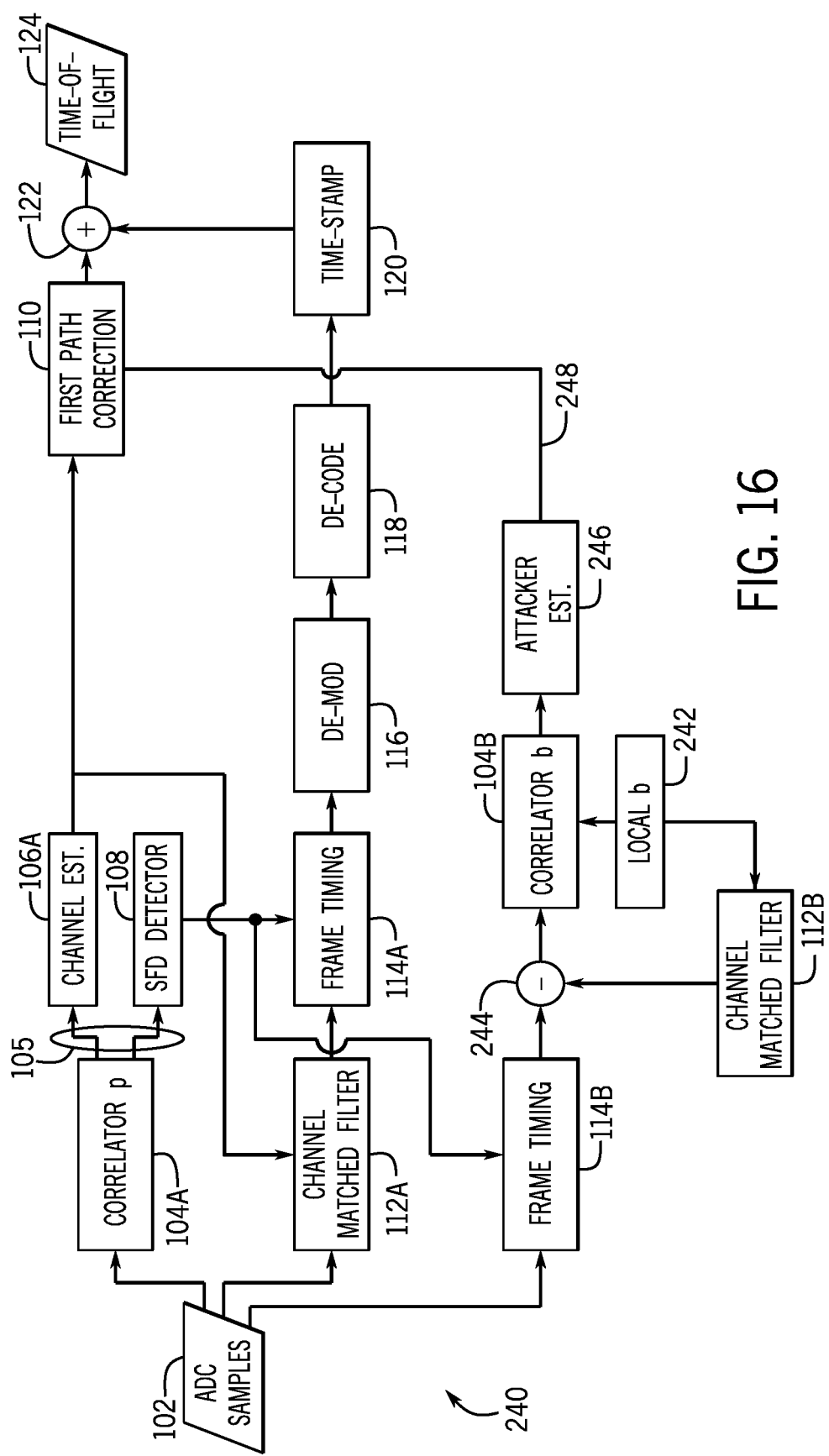
FIG. 16 is a block diagram of another system for securely identifying the wireless channel in the shortest free-space path to determine a time-of-flight through the shortest free-space path between the transmitting device (initiator) and the receiving device (responder) in the presence of an attacker, in accordance with an embodiment.

Another secure receiver system 240, shown in FIG. 16, may allow the responder 62 to thwart attacks like those discussed above by filtering out the attack signal 174 using the shared secret b. The receiver system 240 is described in block diagram form. The various components of the receiver system 240 may be implemented in digital circuitry, software running on a processor (e.g., firmware), or some combination of these.

The receiver system 240 of FIG. 16 may receive digitized analog-to-digital (ADC) samples 102 received from an antenna of the transceiver 28. A first correlator 104A may compare the received ADC samples 102 to a known preamble p. The preamble p may be a predefined set of values that is known at least to the initiator 60 and responder 62. In some embodiments, the preamble p may be publicly known. As such, the preamble p may be sent via plaintext in at least some embodiments. Moreover, the preamble p may take any suitable signal structure that enables the first correlator 104A to accurately and/or efficiently (e.g., with reduced or minimal signal sidelobes) produce a preamble correlation signal 105. The first correlator 104A may provide the preamble correlation signal 105 to a first channel estimation block 106A and a start-of-frame delimiter (SFD) detector 108. The first channel estimation block 106A may estimate the various channels (e.g., free-space channel 69, reflected channel 71, attack channel 176) by analyzing the preamble correlation signal 105 from the first correlator 104A. The result may include a channel impulse response (CIR) that includes the impulse response from the preambles of the various received signals (e.g., free-space first wireless signal 68, reflected second wireless signal 70, attack signal 174). This may be provided to a first path correction block 110, but the first path correction block 110 may not alone rely on the CIR that includes all of the signals to identify the earliest signal arrival to perform first path correction.

Indeed, since the attack signal 174 could be sent through the attack channel 176 in a way that makes the attack signal 174 appear to be the earliest signal, the receiver system 210 may use a shared secrete b to identify the attack signal 174 so it can be filtered out of the CIR at the first path correction block 110. This will be discussed further below.

Before doing so, it is noted that, as in the receiver systems 100 and 210 discussed above, in the receiver system 240, the ADC samples 102 may also enter a channel-matched filter 112 that analyzes the ADC samples 102 for each channel identified by the first channel estimation block 106A. The filtered results may be aligned in a first frame timing block 114A according to the start-of-frame delimiter from the SFD detector 108 to extract data that can be demodulated in a demodulation block 116 and decoded in a decode block 118 to identify a timestamp 120. The timestamp 120 represents the time provided by the initiator 60 that indicates when the initiator 60 transmitted the communication to the responder 62.

In addition, the receiver system 240 may identify the attack signal 174 using a shared secret b. Namely, the shared secret b may be any cryptographically secure value that is known by both the initiator 60 and the responder 62, but which is not known by the attacker 170. In one example, the shared secret b appears as a cryptographically secure pseudorandom number. Thus, if the attacker 170 attempts to retransmit the shared secret b, which does not have a known periodicity like the preamble p that the attacker 170 could exploit, the retransmitted shared secret b would arrive later and could be identified as late for that reason. On the other hand, if the attacker 170 attempts to use a false shared secret b', it will not match the shared secret b that is known by the responder 62.

Thus, the receiver system 240 may use a second frame timing block 114B (which may reuse the same circuitry, software, or other processing logic as the first frame timing block 114A) to align the ADC samples 102 to the start of the frame to begin receiving data that ostensibly contains the shared secret b. A local copy 242 of the shared secret b may be provided to a second channel match filter 112B (which may reuse the same circuitry, software, or other processing logic as the first channel matched filter 112A) and the result subtracted in a subtraction operation 244 from the received data. Because the attacker 170 does not know the shared secret b, the attack signal 174 may use a false shared secret b' that does not match the shared secret b. As a consequence, when the output of the subtraction operation 244 enters a second correlator 104B (which may reuse the same circuitry, software, or other processing logic as the first correlator 104A), any component related to a non-attacker signal (e.g., the free-space first wireless signal 68 or the reflected second wireless signal 70) may result in perfect correlation.

On the other hand, because the shared secret b has a sufficiently high entropy to be secure, and because the attacker 170 does not know the shared secret b, any data from the attack signal 174 that includes a false shared secret b' will produce a noise signal when passed through the second correlator 104B. Moreover, the noise signal will have a random pattern since the false shared secret b' can be expected only to randomly correlate with the true shared secret b. Because the resulting noise signal caused by correlating the false shared secret b' to the true shared secret b will have a predictable noise pattern, an attacker estimation block 246 may use this predictable noise pattern to identify the attack signal 174 on the attack channel 176. An attack signal estimate 248 that corresponds to the attack signal 174 may be provided to the first path correction block 110.

The first path correction block 110 may filter out the component of the CIR that corresponds to the attack signal estimate 248, relying on the channel estimation from the channel estimation block 106 based on the preamble b to determine the first path correction. In this way, the first path correction block 110 of the receiver system 240 of FIG. 16 may be able to determine the arrival time of the first wireless signal 68 on the free-space channel 69 based on the preamble b without performing channel estimation on a shared secret match signal that could have higher-order behavior (e.g., sidelobes), as in the receiver system 210 of FIG. 15. Accordingly, the receiver system 240 of FIG. 16 may be more sensitive to a weaker signal through a true free-space path. By comparing the result of the first path correction block 110 and the timestamp 120 in an adder 122, a time-of-flight value 124 may be computed. The time-of-flight value 124 represents the time taken for the first wireless signal 68 to travel the shortest free-space path via the free-space channel 69 between the initiator 60 and the responder 62. Using the time-of-flight value 124 and the physical parameter of the speed of electromagnetic radiation (e.g., the speed of light), the physical distance between the initiator 60 and the responder 62 can be estimated.

In the receiver system 240 of FIG. 16, the operational results of processing the preamble may be represented as follows:

$$p_{RX} = p * h_{true} + p * h_{attack}$$

$$\hat{h} = p_{RX} * p$$
$$= (h_{true} + h_{attack})(p * p)$$
$$= h_{true} + h_{attack}$$

where $h_{true}$ represents the true free-space channel 69, $h_{attack}$ represents the attack channel 176, p represents the preamble sequence known to both the initiator 60 and the attacker 170, $p_{RX}$ represents the correlation of the preambles from the various channels received by the responder 62, and $\hat{h}$: represents the estimated earliest channel due to the combined true free-space channel 69 and attack channel 176. Here, the known preamble p has perfect autocorrelation.

On the other hand, since the shared secret b is not known to the attacker 170, a false shared secret b' sent in the attack signal 174 would be independent of the true shared secret b sent in the true free-space first wireless signal 68. Thus, in the receiver system 240 of FIG. 16, the operational results of processing the true shared secret b in the true free-space first wireless signal 68 and the false shared secret b' sent in the attack signal 174 may be represented as follows:

$$b_{RX} = b * h_{true} + b' * h_{attack}$$

$$\hat{h}' = (b_{RX} - \widehat{b*h}) * b$$
$$= (b*h_{true} + b' * h_{attack} - b*h_{true} - b*h_{attack}) * b$$
$$= h_{attack}(-b*b + b*b')$$
$$\approx -h_{attack}$$

where $h_{true}$ represents the true free-space channel 69, $h_{attack}$ represents the attack channel 176, b represents the true shared secret known to the initiator 60 but not the attacker 170, b' represents a false shared secret sent by the attacker 170, $b_{RX}$ represents the correlation of the false and true shared secrets from the various channels received by the responder 62, and $\hat{h}'$ represents the estimated attack channel 176. Here, the true shared secret b, but not the false shared secret b', has at least partial autocorrelation. In other words, the use of the shared secret b, and the fact that it is not known to the attacker 170, can be used to estimate the attacker channel 176 and reject the attack signal 174 on the attack channel 176.

An example is shown in FIG. 17. A plot 270 represents a channel impulse response (CIR) that includes the impulse response from the preambles of various received signals, including true signals from an initiator 60 (e.g., the free-space first wireless signal 68 from the free-space channel 69, and the reflected second wireless signal 70 from the reflected channel 71), as well as a false signal from an attacker 170 (e.g., the attack signal 174 from the attack channel 176). A plot 272 represents a channel impulse response (CIR) from an attack channel estimate 248 as determined using the receiver system 240, as discussed above. By rejecting the portions of the CIR signal due to the estimated attack channel 248 (e.g., as shown in plot 272) from the CIR signal due to all of the channels (e.g., as shown in plot 270), a corrected CIR may be obtained as shown in a plot 274. The corrected CIR of plot 274 may include substantially only true signals from the initiator 60. Indeed, this may allow even a faint CIR signal 276 to be detected, which may be due to the true free-space first wireless signal 68 of the free-space channel 69 because it is the earliest signal. Accordingly, an accurate first path correction may be determined even in the presence of an attacker that spoofs a preamble, and even when the rue free-space first wireless signal 68 of the free-space channel 69 is attenuated. With the accurate first path correction, an accurate and secure wireless ranging operation may be performed via the time-of-flight, to thereby determine a proximity between the initiator 60 and the responder 62.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method comprising:
  receiving, into a wireless receiver system, digital samples of a plurality of wireless signals, wherein the plurality of wireless signals comprises a true wireless ranging signal from a first transmitting device and a false wireless ranging signal from a second transmitting device;
  correlating, in the wireless receiver system, the digital samples with a preamble sequence to generate preamble match signals corresponding to a correlation of the digital samples and the preamble sequence;
  performing channel estimation, in the wireless receiver system, using the preamble match signals to obtain a channel impulse response for the plurality of wireless signals;
  filtering, using the wireless receiver system, the channel impulse response, as a filtered channel impulse response, for the plurality of wireless signals, wherein the filtering removes at least part of the channel impulse response due to the false wireless ranging signal while not removing at least part of the channel impulse response due to the true wireless ranging signal; and using the filtered channel impulse response to perform a wireless ranging operation.

2. The method of claim 1, wherein:

the true wireless ranging signal includes a shared secret known to the wireless receiver system;

the false wireless ranging signal does not include the shared secret;

the method comprises correlating, in the wireless receiver system, the digital samples with the shared secret to generate shared secret match signals corresponding to a correlation of the digital samples and the shared secret; and the method comprises estimating an attacker channel, as an estimated attacker channel, that conveys the false wireless ranging signal, wherein the estimated attacker channel enables the filtering of the channel impulse response.

3. The method of claim 2, wherein correlating the digital samples with the shared secret is performed using a first correlator block and correlating the digital samples with the preamble sequence is also performed using the first correlator block.

4. The method of claim 2, comprising frame-timing the digital samples as frame-timed digital samples, and subtracting the frame-timed digital samples from a first channel matched filter, wherein the first channel matched filter is matched based at least in part on the shared secret, before correlating the digital samples with the shared secret.

5. The method of claim 1, wherein the channel impulse response for the plurality of wireless signals is filtered based at least in part on a shared secret known to the wireless receiver system, wherein the true wireless ranging signal contains the shared secret but the false wireless ranging signal does not contain the true wireless ranging signal.

6. The method of claim 5, wherein the false wireless ranging signal contains a false shared secret, wherein the false wireless ranging signal is identifiable at least in part because an autocorrelation of the false shared secret with a local copy of the shared secret of the wireless receiver system is worse than an autocorrelation of the shared secret contained in the true wireless ranging signal with the local copy of the shared secret of the wireless receiver system.

7. The method of claim 1, wherein the wireless ranging operation comprises extracting a timestamp from the plurality of wireless signals, identifying from the filtered channel impulse response a timing of receipt of the true wireless ranging signal, and comparing the timestamp to the timing of receipt of the true wireless ranging signal to determine a time-of-flight of the true wireless ranging signal.

8. An electronic device comprising communication circuitry, wherein the communication circuitry comprises:

an antenna configured to receive a plurality of wireless signals at least partly overlapping in time, wherein the plurality of wireless signals comprises:

from a first transmitting device, a first wireless signal via a free-space path between the electronic device and the first transmitting device, wherein the first wireless signal comprises a preamble and a shared secret, wherein the shared secret is shared by the first transmitting device and the electronic device; and from a second transmitting device, a second wireless signal comprising the preamble; and a receiver system coupled to the antenna, wherein the receiver system is configured to:

receive the plurality of wireless signals;

identify a free-space channel over which the first wireless signal is received; and determine a time-of-flight of the first wireless signal after identifying the free-space channel.

9. The electronic device of claim 8, wherein the receiver system is configured to perform channel estimation based at least in part on the preamble and the shared secret to identify the free-space channel.

10. The electronic device of claim 9, wherein the receiver system is configured to use a same correlator block to correlate the preamble with the plurality of wireless signals to obtain preamble match signals and to correlate the shared secret with the plurality of wireless to obtain shared secret match signals, and wherein the receiver system is configured to use a same channel estimation block to perform channel estimation using the preamble match signals and to perform channel estimation using the shared secret match signals.

11. The electronic device of claim 8, wherein the receiver system is configured to:

correlate digital samples of the first wireless signal and the second wireless signal with a preamble sequence to generate preamble match signals corresponding to a correlation of the digital samples and the preamble sequence;

performing channel estimation using the preamble match signals to obtain a channel impulse response for the first wireless signal and the second wireless signal;

filtering the channel impulse response, as a filtered channel impulse response, for the first wireless signal and the second wireless signal, wherein the filtering removes at least part of the channel impulse response due to a false wireless ranging signal associated with the preamble from the second transmitting device without the shared secret while not removing at least part of the channel impulse response due to a true wireless ranging signal associated with the preamble from the first transmitting device; and using the filtered channel impulse response to perform a wireless ranging operation.

12. An electronic device, comprising:

one or more antennas; and a receiver system coupled to the one or more antennas, wherein the receiver system is configured to receive digital samples of a plurality of wireless signals, wherein the plurality of wireless signals comprises a true wireless ranging signal from a first transmitting device and a false wireless ranging signal from a second transmitting device, correlate the digital samples with a preamble sequence to generate preamble match signals corresponding to a correlation of the digital samples and the preamble sequence, perform channel estimation using the preamble match signals to obtain a channel impulse response for the plurality of wireless signals, filter the channel impulse response, as a filtered channel impulse response, for the plurality of wireless signals, wherein the filtering removes at least part of the channel impulse response due to the false wireless ranging signal while not removing at least part of the channel impulse response due to the true wireless ranging signal, and use the filtered channel impulse response to perform a wireless ranging operation.

13. The electronic device of claim 12, wherein:

the true wireless ranging signal includes a shared secret known to the receiver system;

the false wireless ranging signal does not include the shared secret; and the receiver system is configured to correlate the digital samples with the shared secret to generate shared secret match signals corresponding to a correlation of the digital samples and the shared secret.

14. The electronic device of claim 13, wherein the receiver system is configured to estimate an attacker channel as an estimated attacker channel that conveys the false wireless ranging signal, wherein the estimated attacker channel enables the filtering of the channel impulse response.

15. The electronic device of claim 13, wherein the receiver system is configured to correlate the digital samples with the shared secret by using a first correlator block and correlate the digital samples with the preamble sequence by using the first correlator block.

16. The electronic device of claim 12, wherein the receiver system is configured to frame-time the digital samples as frame-timed digital samples, and subtract the frame-timed digital samples from a first channel matched filter.

17. The electronic device of claim 16, wherein the first channel matched filter is matched based at least in part on the shared secret before correlating the digital samples with the shared secret.

18. The electronic device of claim 12, wherein the receiver system is configured to filter the channel impulse response for the plurality of wireless signals based at least in part on a shared secret known to the receiver system, the true wireless ranging signal containing the shared secret, and the false wireless ranging signal not containing the true wireless ranging signal.

19. The electronic device of claim 18, wherein the false wireless ranging signal contains a false shared secret, wherein the receiver system is configured to identify the false wireless ranging signal based at least in part on comparing an autocorrelation of the false shared secret with a local copy of the shared secret of the receiver system to an autocorrelation of the shared secret contained in the true wireless ranging signal with the local copy of the shared secret of the receiver system.

20. The electronic device of claim 12, wherein the receiver system is configured to perform the wireless ranging operation by extracting a timestamp from the plurality of wireless signals, identifying from the filtered channel impulse response a timing of receipt of the true wireless ranging signal, and comparing the timestamp to the timing of receipt of the true wireless ranging signal to determine a time-of-flight of the true wireless ranging signal.

\* \* \* \* \*